United States Patent [19]

Komatsu et al.

[11] Patent Number: 5,465,330
[45] Date of Patent: Nov. 7, 1995

[54] NETWORK ADDRESS MANAGING METHOD AND SYSTEM

[75] Inventors: Takao Komatsu; Akira Kanda, both of Kanagawa, Japan

[73] Assignee: Mitsubishi Denki Kabushiki Kaisha, Tokyo, Japan

[21] Appl. No.: 203,673

[22] Filed: Feb. 28, 1994

Related U.S. Application Data

[63] Continuation of Ser. No. 701,102, May 16, 1991, abandoned.

[30] Foreign Application Priority Data

Jun. 14, 1990 [JP] Japan ................................ 2-155691
Jul. 3, 1990 [JP] Japan ................................ 2-175749

[51] Int. Cl.$^6$ .................................................. G06F 15/16
[52] U.S. Cl. ................. 395/824; 364/241; 364/242.94; 364/DIG. 1; 364/DIG. 2; 395/829; 395/830; 395/200.1; 395/284
[58] Field of Search ................................ 395/200, 325

[56] References Cited

U.S. PATENT DOCUMENTS

| | | | |
|---|---|---|---|
| 4,032,899 | 6/1977 | Jenny | 364/DIG. 1 |
| 4,388,686 | 6/1983 | Haid | 364/DIG. 1 |
| 4,586,134 | 4/1986 | Norstedt | 395/200 |
| 4,644,496 | 2/1987 | Andrews | 395/800 |
| 4,891,751 | 1/1990 | Call | 395/800 |
| 5,079,738 | 1/1992 | Bockenfeld | 395/800 |
| 5,170,482 | 12/1992 | Shu | 364/DIG. 1 |

FOREIGN PATENT DOCUMENTS

| | | |
|---|---|---|
| 0082889 | 7/1983 | European Pat. Off. . |
| 1-66640 | 6/1989 | Japan . |

OTHER PUBLICATIONS

Computer Networks & ISDN Systems, "Implementation of a Dynamic Address Assignment Protocol in a Local Area Network", Loucks.

*Primary Examiner*—David Y. Eng
*Attorney, Agent, or Firm*—Wolf, Greenfield & Sacks

[57] ABSTRACT

A network address managing system includes ports distributed over a network, and nodes constructed to be connected to the ports in a plug-in manner. Each of the ports includes a port identifier storage section for setting a unique port identifier. Each of the ports further includes a port control section for determining a coincidence between a port identifier ID, which is sent over the network along with a node address, and a port identifier ID stored in the port identifier storage section. Upon determination of such a coincidence, the port control section stores the node address transferred in the node address section. When a node is connected to the port, the control section trasnfers the stored address to the node. Each of the nodes includes a node address storage location for storing a node address, and a node control section for storing the node address transferred from the connected port in the node address storage section of the node.

9 Claims, 3 Drawing Sheets

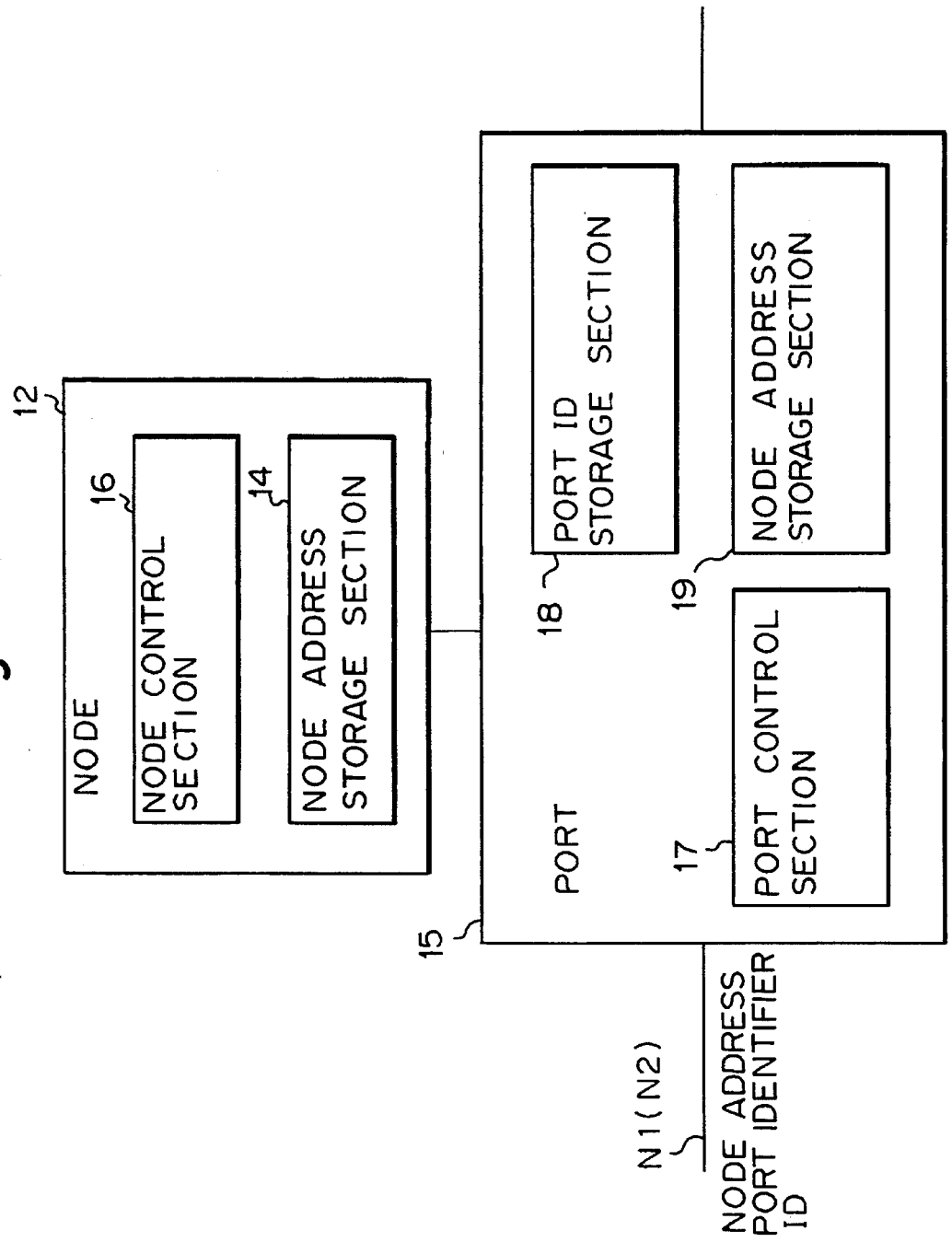

NETWORK ADDRESS MANAGING METHOD AND SYSTEM

This application is a continuation of application Ser. No. 07/701,102, filed May 16, 1991, now abandoned.

BACKGROUND OF THE INVENTION

1. Field of the Invention

The present invention relates to a network address managing method and system for managing network (node) addresses at node positions in a network system which comprises ports connected to the network and nodes connectable to the ports in a plug-in manner.

2. Prior Art

FIG. 1 is a block diagram showing the configuration of a network system which adopts a conventional network address managing system. In FIG. 1, the reference numeral 11 denotes a plurality of ports connected to network cables N1, N2 for input/output of information, 12 a plurality of nodes connectable to the ports 11 in a plug-in manner, and 13 gate ways (or bridges) for interconnecting the network cables N1 and N2.

FIG. 2 is a representation showing a correspondence table 25 between node names and node addresses. The node 12 of a node name A is located at a node address 1-1, the node 12 of a node name B at a node address 1-2, the node 12 of a node name C at a node address 2-1, and the node 12 of a node name D at a node address 2-2, respectively.

Processing by means of that conventional network address managing system will now be described. When the nodes 12 are connected to the network cables N1, N2 via the ports 11, a management operator of the network assigns respective nodes their node addresses corresponding to node names, as exemplarily shown in the correspondence table 25 of FIG. 2, for uniquely identifying the nodes throughout the network. Sharing of the correspondence table 28 allows each node 12 to know the node address of the node 12 to be communicated and carry out communication with that node 12.

The above conventional network address managing system is problem free in the case that the network configuration is fixed and does not change. However, when the nodes are optionally connectable to the ports in a plug-in manner, the nodes can be easily moved from network to network, which leads to the problem described below. Namely, whenever any of the nodes is moved among networks, the management operator of the system must update the correspondence table between node names and node addresses for each network without causing a contradiction in the table and, as a result, the burden imposed on the management operator is increased.

More specifically, in FIG. 1, each node 12 incorporates therein a node address storage section 14 to store its own address, and is connected to the network cable N1 or N2 via the port 11. By connecting a number of nodes to the respective network cables in such a manner, the nodes can be distributed over the network.

Looking at a network environment including the nodes distributed therein, each node 12 holds in the node address storage section 14 a node address used for identifying itself in the network, and is also connected to the network cable N1 or N2 via the port 11.

Thus, the nodes 12 on the network are connected to the network cables N1, N2 via the respective ports 11 and hold in their node address storage sections 14 respective node addresses uniquely assigned throughout the network. While each node is identified on the network using its node address, the node is connected to the port in a plug-in manner and thus portable. When the node is connected to another network, the content of the node address storage section 14 is corrected because of a different node address assigned thereto.

Since the conventional ports just connect the nodes and the network cables, none of the nodes can identify to which port out of the numeral ones it is connected. In order to identify the node, therefore, it is required for the node to directly hold the node address corresponding to the port to which it is connected. Furthermore, in the case that the node is connected to another port in a plug-in manner and moved to another network, the node address must be updated so as to correspond to the port to which it has been newly connected.

To solve the above problem, there has so far been disclosed "an address determining system" in Japanese Patent Public Disclosure (Kokai) No. 1-166640. With this system, a star connection LAN system includes a network extension unit interconnecting respective terminals wherein a local address transferred to the terminal is initially set by setting a dip switch or the like. When a first terminal is connected to the LAN system, the initially set local address is transferred to the first terminal and when a next terminal is connected to the LAN system, the initially set local address is counted up and the resulting local address is transferred to the newly connected next terminal. As a result, there are a plurality of network extension units each of which is required to initially set the local address, and set a new local address by hardware means in need of updating to another local address. The incidental work or processing and address management become more intricate as the number of units increases.

SUMMARY OF THE INVENTION

The present invention has been made in view of solving the problem mentioned above, and is to provide a network address managing method which does not require a management operator to manage network addresses resulting from the movement of nodes.

Another object of the present invention is to provide an intelligent port which can eliminate The need of changing node addresses on the node side even if nodes are moved anywhere, and can properly set and arbitrary node address to each port, without taking into account the network configuration.

In a network address managing method according to the present invention, a correspondence table between port identifiers and node addresses is prepared, and the node addresses are assigned to respective ports having the corresponding port identifiers. When one node is connected to some port in a plug-in manner, a correspondence between a node name and a node address is given via the port identifier for management of the node address at which the node is positioned.

Thus, with the method of the present invention, the node address is assigned to the port having the corresponding port identifier in accordance with the correspondence table. Upon connection of one node to a port, a port identifier unique to the port operates to provide a correspondence between the node name and the node address. This enables it to manage the network addresses at the respective node positions.

An intelligent port according to the present invention is used in a network system wherein nodes are connectable in a plug-in manner to ports distributed over a network, and is constructed by incorporating in each of the ports both a port ID storage section for setting a unique port identifier ID therein, and a control section for determining a coincidence between the set port identifier ID and a port identifier ID sent over the network along with a node address, storing the node address in the node address storage section upon determination of the coincidence, and, when some node is connected to that port, transferring the stored node address to the node for storage therein.

The control section of each intelligent port according to the present invention determines a coincidence between the port identifier ID sent over the network along with the node address and the port identifier ID stored in the port ID storage section. When the coincidence is determined, it updates the node address already stored in the node address storage section with the node address sent thereto. Upon connection of a node to that port, the updated node address is transferred to the node. Therefore, the node can automatically update the node address in the node at the connection time of the node, without having to recognize the node address set on the port side.

In other words, according to the present invention, since the correspondence table between the port identifiers and the node addresses is prepared, and the node addresses are assigned to the respective fixed ports having the corresponding port identifiers in the network, the correspondence between the node name and the node address can be automatically created in pair even if the node is moved over the network. As a result, it is possible to automate management of the node addresses at the node positions, and thus greatly the burden imposed on a management operator of the network.

Also, according to the present invention, since the port holds the node address so that the node address may be automatically set in the node upon connection of the node to the port, it is to possible to prevent an increase in the node address management operation incidental to an improved portability of nodes.

BRIEF DESCRIPTION OF THE DRAWINGS

FIG. 5 is a block diagram showing the configuration of the node and the port in the system of the embodiment shown in FIG. 3.

DETAILED DESCRIPTION OF THE PREFERRED EMBODIMENTS

Figures 1, 2:
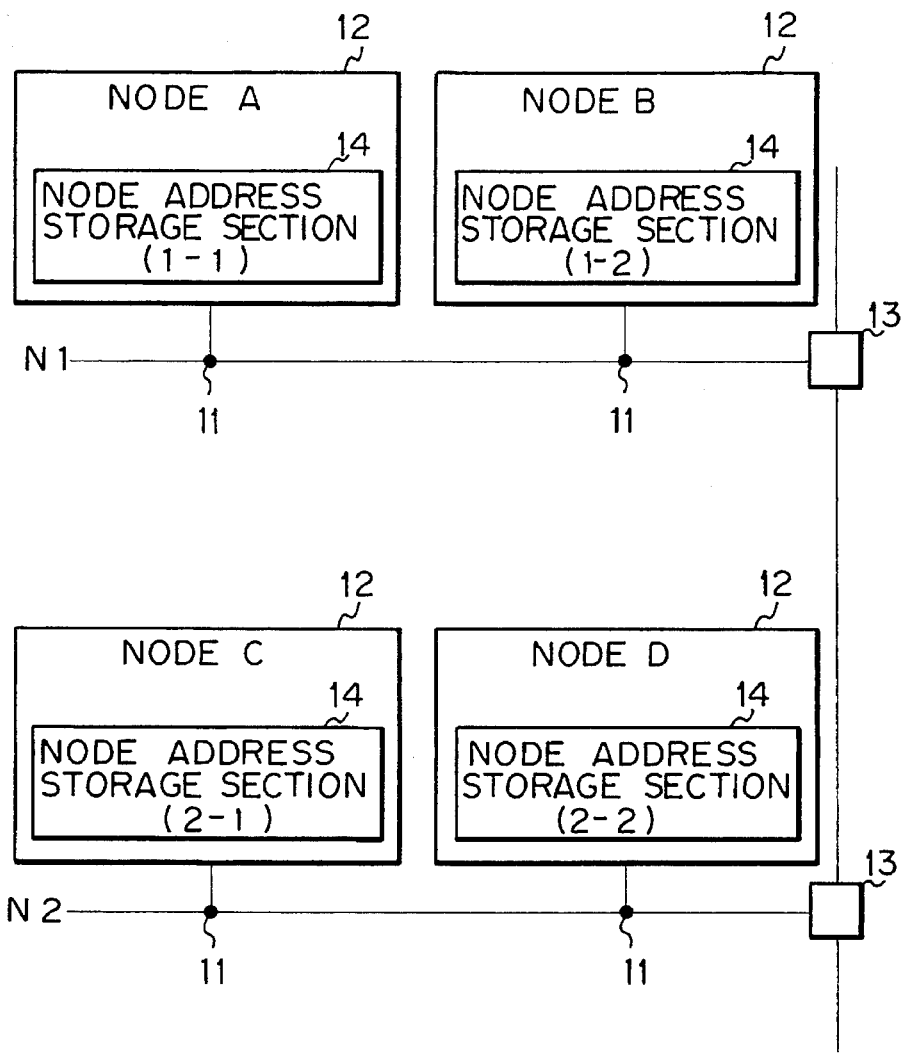
FIG. 1 is a block diagram showing the configuration of a network system which adopts a conventional network address managing system.
FIG. 2 is a representation showing a correspondence table between node names and node addresses in the conventional system of FIG. 1.
Figures 3, 4:
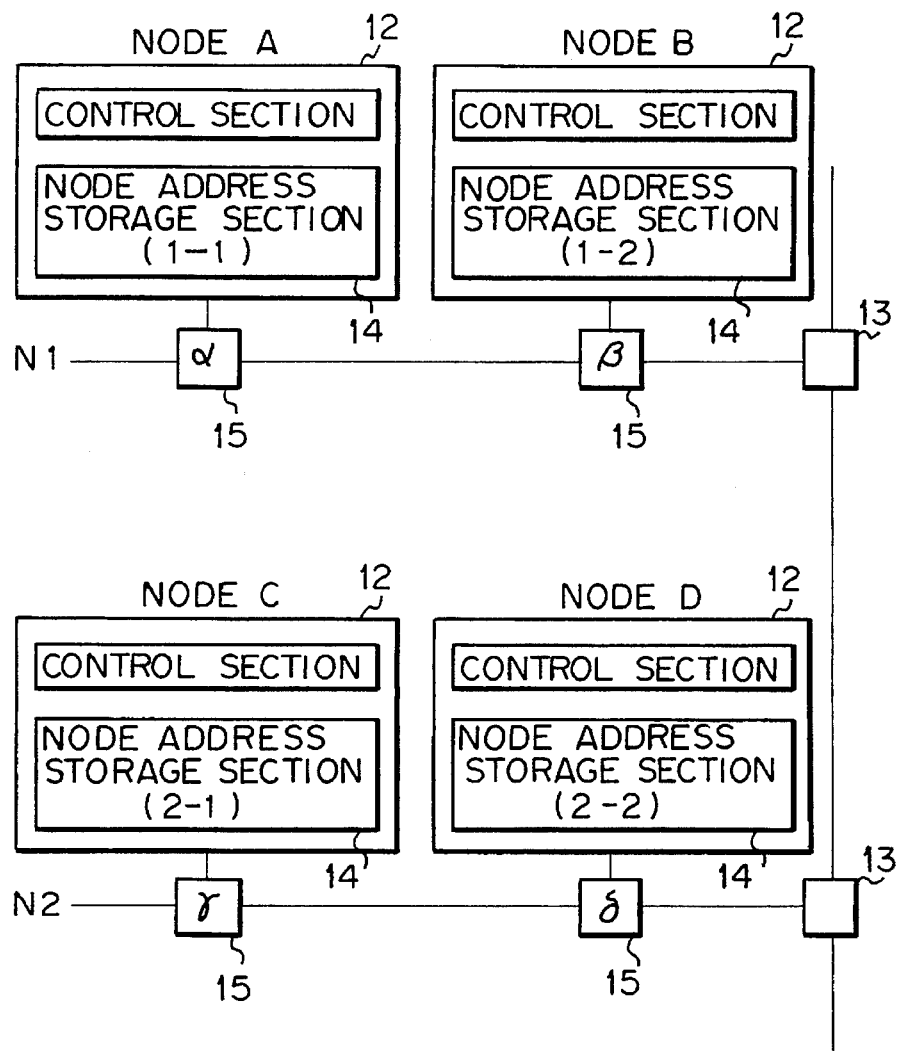
FIG. 3 is a block diagram conceptually showing the configuration of a network system which adopts a network address managing system according to one embodiment of the present invention.
FIG. 4 is a representation showing a correspondence table between port ID's and node addresses in the system of the embodiment shown in FIG. 8.

FIG. 3 is a block diagram showing the configuration of a network system which adopts a network address managing system according to one embodiment of the present invention. In FIG. 3, the identical components to those in FIG. 1 are denoted by the same reference numerals and will not be described again. Referring to FIG. 3, nodes 12 are connected to network cables N1, N2 via intelligent ports 15 having unique port identifiers (ID) such as $\alpha$, $\beta$, $\gamma$, $\delta$, . . . , respectively. The network cables N1, N2 are interconnected via gate ways (or bridges) 13.

FIG. 4 illustrates a correspondence table 24 between port ID's and node addresses. In the correspondence table, $\alpha$, $\beta$, $\gamma$, $\delta$ are port identifiers, and 1-1, 1-2, 2-1, 2-2 are node addresses indicating positions of the nodes 12 given with node names A, B, C, D and connected to the ports having their port identifiers $\alpha$, $\beta$, $\gamma$, $\delta$, respectively.

Processing in the network address managing system of this embodiment will now be described below. When constructing a network, a management operator of the network prepares a correspondence table between port ID's and node addresses, like that shown in FIG. 4, for identifying the nodes 12, which is shared within the network. This correspondence table is not changed unless a port is added to or deleted from the system.

Because communication is carried out among the nodes 12, there must be known a node address corresponding to a node to be communicated with. This is achieved by the port 15 informing the node address to the node 12 when the node 12 is plugged into the port 15. Thus, the node 12 receives the node address from the port 15 upon its connection to the port 15, whereby the correspondence between the node name and the node address is determined via the port identifier in the correspondence table in one-to-one relation. Stated otherwise, with a sharing of correspondence between node names and node addresses in the system, the same information as given by the conventional correspondence table, such as that shown in FIG. 2, is automatically created in the node 12. Consequently, correspondence between node names and node addresses can be automatically updated in pairs upon movement of the nodes 12 connectable to the ports 15 in a plug-in manner, making it possible to reduce the burden imposed on the management operator.

FIG. 5 is a block diagram showing the configuration of the network system, in which the intelligent port 15 used in the embodiment of FIG. 3 is shown in more detail.

As with the above, in FIG. 5, the node 12 is connected to the network cable N1 by being plugged into the intelligent port 15. The node 12 incorporates therein a node address storage section 14, and a node control section 16 for transferring node address information to the node address storage section 14 under control. The port 15 has a port control section 17, a port ID storage section 18 and a node address storage section 19 on the port side, the node address storage section 19 holding the node address. At the time when the node 12 is connected to the port 15, the node address in the port-side node address storage section is transferred to the node 12 by the port control section 17 and held in the node-side node address storage section 14.

Operation of the embodiment shown in FIG. 5 will be described below. The port control section 17 determines whether or not the port identifier ID stored in the port ID storage section 18 coincides with a port identifier ID sent over the network along with a node address. When coincidence therebetween is determined, the port control section 17 operates to receive the node address which has been sent over the network and to store it in the node address storage section 19. When it is required to update the node address already stored, a new update node address is sent over the network cable N1 along with the port identifier ID of the port in which the node address to be updated is stored. Consequently, the port control section 17 of the port 15, which has the port ID storage section 18 storing the same port identifier ID as that sent, takes in the update node address and stores it in the node address storage section 19.

After the node address storage section 19 of the port 15 has acquired and stored the node address in such a manner, when the node 12 is connected to the port 15, the port control section 17 first transfers the node address information stored in the port-side node address storage section 19 to the node 12, and the node control section 16 of the node 12 then stores the node address information in the node-side node address storage section 14.

What is claimed is:

1. A method, for use in a network system including a plurality of ports connected over a network to input and output information therethrough, for managing node addresses of a plurality of nodes constructed to be connected to said plurality of ports, said method comprising the steps of:

storing a port identifier in a port identifier storage section in each of said plurality of ports, wherein each port has a unique port identifier, transferring a node address over the network to a first node address storage section in the one of said plurality of ports in which a port identifier that corresponds to the node address is stored, according to a correspondence table between port identifiers and node addresses, wherein said step of transferring is performed for each of said plurality of ports, and wherein each port receives a unique node address, and upon connection of one of said nodes to one of said ports, transferring the node address in the first node address storage section of said one of said ports to a second node address storage section of said one of said nodes, whereby a correspondence is determined between said one of said nodes and said node address to allow said one of said nodes to be accessed using said node address.

2. The method of claim 1 further comprising a step of connecting said one of said nodes to said one of said ports in a plug-in manner.

3. The method of claim 1, wherein said step of transferring a node address to a first node address storage section of one of said ports includes the steps of receiving, over the network and with the node address, a port identifier identifying said one of said ports to which the node address is to be transferred, detecting whether the port identifier stored in said one of said ports coincides with the port identifier received over the network, and storing said node address in said first node address storage section only when said step of detecting detects a coincidence.

4. The method of claim 3 further comprising a step of connecting said one of said nodes to said one of said ports in a plug-in manner.

5. A network system comprising:

a plurality of ports distributed over a network to input and output information therethrough, a plurality of nodes, each connected to one of said plurality of ports, wherein each of said plurality of ports comprises:

a port identifier storage section for setting a unique port identifier therein, a first node address storage section for storing a node address transferred over said network therein, and a port control section responsive to said port identifier storage section for determining a coincidence between a port identifier ID sent over said network along with said node address and the port identifier ID stored in said port identifier storage section, for storing the node address transferred thereto in said first node address storage section upon determination of the coincidence, and for transferring the stored node address to said node when one of said plurality of nodes is connected to said port, and wherein each of said plurality of nodes comprises:

a second node address storage section for storing a node address therein, and a node control section for storing the node address stored in said first node address storage section of said connected port into said second node address storage section of said node, said second node address storage section being responsive to said node control section.

6. The network system of claim 5 wherein a port has a connection for a node that permits a node to be connected in a plug-in manner.

7. A port for a network system in which a plurality of ports are interconnected in a network, wherein each port may connect to at least one node, wherein a node has a node address storage section, the port comprising:

a port identifier storage section in which a first port identifier is stored;

node address storage; and a port control section including:

means for receiving a node address and a second port identifier from the network;

means for comparing the second port identifier with the first port identifier and for storing the node address received from the network in the node address storage only when the first port identifier matches the second port identifier; and means, operative when a node is connected to the port, for transferring the node address stored in the node address storage to the node address storage section in the node.

8. The port of claim 7 wherein the port has a connection for a node that permits a node to be connected in a plug-in manner.

9. A method implemented by a port for a network system in which a plurality of ports are interconnected in a network, wherein each port may connect to at least one node and has a port identifier storage section in which a first port identifier is stored and a node address storage, wherein a node has a node address storage section, the method comprising the steps of:

receiving a node address and a second port identifier from the network;

comparing the second port identifier with the first port identifier;

storing the node address received from the network in the node address storage only when the first port identifier matches the second port identifier; and transferring, when a node is connected to the port, the node address stored in the node address storage to the node address storage section in the node.

* * * * *